(12) United States Patent
Hampp

(10) Patent No.: US 7,835,563 B2
(45) Date of Patent: Nov. 16, 2010

(54) METHOD OF GUARANTEEING THE AUTHENTICITY OF DOCUMENTS BY CHECKING FOR THE PRESENCE OF A CHANGED FEATURE, AND THE DOCUMENT

(75) Inventor: Norbert Hampp, Amoeneburg-Rossdorf (DE)

(73) Assignee: Actilor GmbH, Leuna (DE)

( * ) Notice: Subject to any disclaimer, the term of this patent is extended or adjusted under 35 U.S.C. 154(b) by 1045 days.

(21) Appl. No.: 10/499,438

(22) PCT Filed: Dec. 19, 2002

(86) PCT No.: PCT/EP02/14583

§ 371 (c)(1),
(2), (4) Date: Sep. 17, 2004

(87) PCT Pub. No.: WO03/052701

PCT Pub. Date: Jun. 26, 2003

(65) Prior Publication Data

US 2005/0047593 A1 Mar. 3, 2005

(30) Foreign Application Priority Data

Dec. 19, 2001 (DE) .................. 101 62 537

(51) Int. Cl.
*G06K 9/00* (2006.01)
(52) U.S. Cl. ........................................ 382/135
(58) Field of Classification Search ........... 382/112, 382/135, 137, 138, 139, 140, 254; 902/7–9; 356/71–73; 194/4–6; 235/379–381
See application file for complete search history.

(56) References Cited

U.S. PATENT DOCUMENTS

| | | | |
|---|---|---|---|
| 3,636,318 A | | 1/1972 | Lindstrom et al. |
| 4,186,943 A | * | 2/1980 | Lee .............................. 283/91 |
| 4,489,318 A | | 12/1984 | Goldman |
| 4,547,002 A | | 10/1985 | Colgate, Jr. |
| 5,354,097 A | | 10/1994 | Tel |
| 5,388,862 A | | 2/1995 | Edwards |
| 5,592,561 A | | 1/1997 | Moore |
| 5,974,150 A | | 10/1999 | Kaish et al. |
| 6,111,953 A | | 8/2000 | Walker et al. |
| 6,246,061 B1 | * | 6/2001 | Ramsey et al. ........... 250/458.1 |
| 2001/0022848 A1 | | 9/2001 | Rhoads |
| 2001/0046294 A1 | | 11/2001 | Bandy et al. |
| 2005/0024955 A1 | * | 2/2005 | Brosow ....................... 365/200 |

FOREIGN PATENT DOCUMENTS

DE 28 02 430 A1 7/1978

(Continued)

*Primary Examiner*—Samir A. Ahmed
*Assistant Examiner*—Atiba O. Fitzpatrick
(74) *Attorney, Agent, or Firm*—Rothwell, Figg, Ernst & Manbeck, P.C.

(57) ABSTRACT

What are proposed are a method and a system for guaranteeing the authenticity or checking the authenticity of documents, in particular banknotes or the like, which each have a substrate (1) with specific substrate features (2), an image of the substrate being recorded before a document is issued and the image data obtained in the process being stored in a manner assigned to document data, in order to keep these data ready for possible later comparison enquiries concerning the authenticity of an issued document.

15 Claims, 3 Drawing Sheets

FOREIGN PATENT DOCUMENTS

| | | |
|---|---|---|
| DE | 28 29 778 A1 | 1/1980 |
| EP | 0 570 162 A2 | 11/1993 |
| EP | 0 940 945 A | 9/1999 |
| GB | 2 180 564 A | 4/1987 |
| GB | 2 324 065 A | 10/1998 |
| WO | WO 98 57299 A | 12/1998 |
| WO | WO 01 18754 A | 3/2001 |
| WO | WO 02 083423 A | 10/2002 |

* cited by examiner

Fig.1
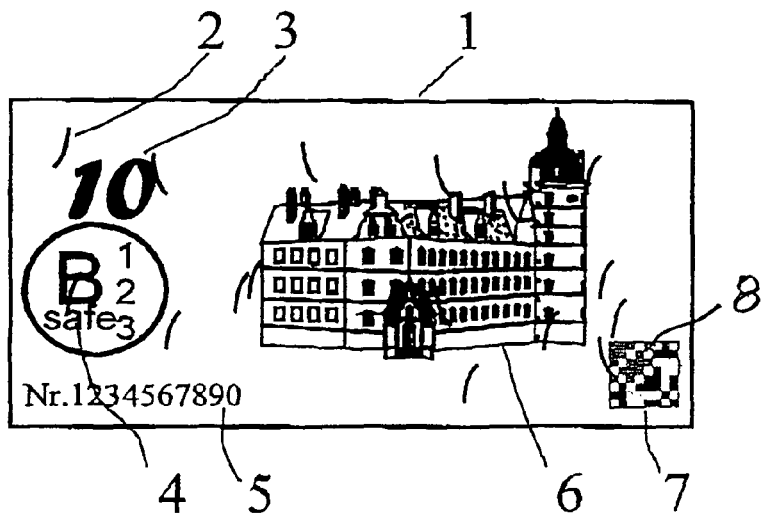
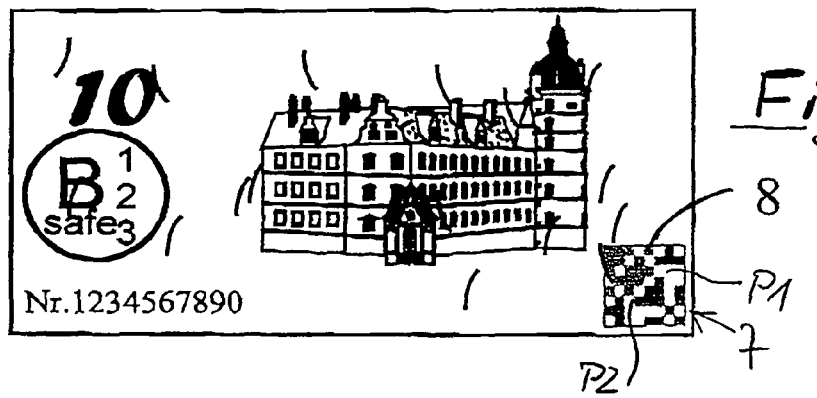
Fig.3a
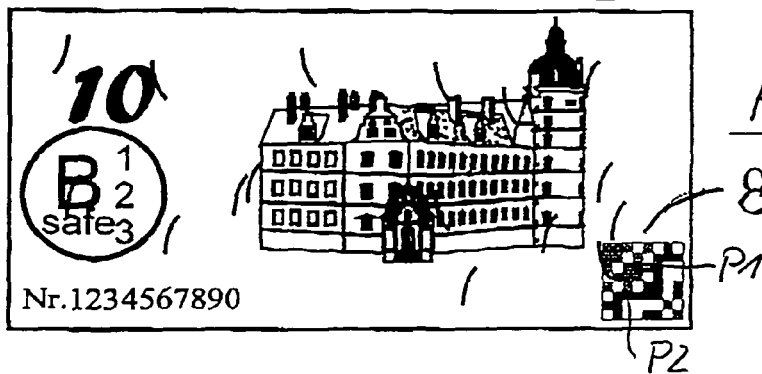
Fig.3b

METHOD OF GUARANTEEING THE AUTHENTICITY OF DOCUMENTS BY CHECKING FOR THE PRESENCE OF A CHANGED FEATURE, AND THE DOCUMENT

CROSS REFERENCE TO RELATED APPLICATION

This application is a 35 USC §371 National Phase Entry Application from PCT/EP02/14583, filed Dec. 19, 2002, and designating the U.S.

DESCRIPTION

The invention relates to a method for guaranteeing the authenticity of documents, in particular banknotes, securities, passes, entrance cards, credit cards, smart cards or the like, which each have a substrate with specific substrate features that can be detected optically or in a spatially resolved manner, and which are provided with document data.

Despite intensive endeavors to configure security documents, in particular banknotes, in such a way that deceptive imitations are as far as possible precluded, counterfeiters are nevertheless successful again and again in putting counterfeit documents into circulation. Cases of banknote forgeries have become known in which not only the printed pattern of banknotes has been reproduced almost exactly, but also the substrate used for the banknotes, that is to say the special security paper. Such examples have shown that money counterfeiters are able and also prepared to expend a high outlay in order to make their counterfeit products appear as authentic as possible.

In the course of the endeavors to make documents as forgery-proof as possible, considerations have already been formulated for preparing the substrate material for security documents such that the authenticity of a document comprising such a substrate material can be checked by means of special tests which, however, are simple to carry out. One example of such considerations is set forth in U.S. Pat. No. 6,054,021. In accordance with U.S. Pat. No. 6,054,021, fluorescent cellulosic fibers are admixed with the paper pulp during substrate production for a security paper, said fibers being distributed stochastically in the paper mass. A document produced from a paper mass prepared in this way thus has a random distribution of fluorescent cellulosic fibers in its substrate, which stand out from their surroundings with high optical contrast under fluorescence conditions. In order to check the authenticity, such documents are exposed to a radiation that stimulates the fluorescence of the fibers, e.g. UV radiation. If no fluorescent fibers appear in this case, then the document is qualified as counterfeit.

It is not possible to rule out the situation wherein document counterfeiters expend such a high outlay that, in conformity to the guaranteeing of authenticity described above, they likewise use substrates with fluorescent particles or imitate these substrates.

The invention is based on the object of specifying an improved method for guaranteeing the authenticity of documents which makes it substantially more difficult to counterfeit the relevant documents.

In the method according to the invention for guaranteeing the authenticity of documents, in particular banknotes, securities, passes, entrance cards, credit cards or the like, which each have a substrate with specific substrate features than can be detected in a spatially resolved manner, and which are provided with document data, a respective document, before being issued, is. analyzed in a spatially resolved manner altogether or partly—and a data record with information about the arrangement and/or fashioning of specific substrate features of the document is generated in the process, the data of said data record or data derived therefrom being stored in a database together with or in a manner assigned to document data of the relevant document, in order to keep them ready for later authentication enquiries.

The specific substrate features under consideration here are, in particular, structural details of the substrate, which is preferably prepared to form a sheet, said details having a stochastic or quasi-stochastic form design or distribution in or on the substrate. Special structural features may be involved in this case, by way of example, such as, for instance fiber structural features, microstructure structural features, foreign body inclusion features or the like, which do not significantly change their appearance image—detectable by spatially selective analysis—even in the course of wearing treatment of the relevant document in later use, since, during a later authenticity check, a relevant document is intended to be recognizable (at least also) on account of such specific substrate features.

Appropriate substrate materials are, in particular, paper, cardboard, plastic, textile, metal, etc.

The spatially resolved analysis of the document is preferably effected optically by an imaging method, the data obtained in the process containing image information about the region of the document under consideration. These image data and/or data derived therefrom in the course of data compression, coding or according to some other predetermined data processing process are stored in the database for authentication purposes. The spatially resolved analysis particularly preferably consists in the respective document or a particular region thereof being optically scanned by means of a scanner device or being photographed or, if appropriate, videographed by means of a digital camera.

In accordance with one variant of the method according to the invention, both sides of a document are optically acquired completely or partly, in order to obtain data for the description of the substrate features. Given a sufficient thickness of a document, it may furthermore be provided that the peripheral region or the edge region is also or exclusively included in the optical acquisition.

Document data are customarily provided on the respective substrate in the form of graphical patterns, markings, image elements and/or inscriptions, etc. However, in the case of documents with relevant storage media, document data may also or alternatively be stored in memory chips, magnetic strips, etc.

General document data such as specifications of value, printing image elements, document manufacturer indications or the like are normally embodied identically for a relatively large number of documents of a document type. Specific document data such as serial numbers, individual markings, etc. are normally different for all documents of a document type and are therefore suitable as an assignment criterion in the storage of the data obtained during the spatially selective analysis of a document (substrate feature information).

By virtue of the electronic storage "of an image" of the substrate structural details that are specific to each document, because they are formed or distributed under quasi-random conditions, in a manner assigned to specific document data which identify the document as such, a comparison data record specific to each document is thus created before the document is issued by the document manufacturer or, if appropriate, a separate authorization entity, said comparison data record being kept ready for possible later comparison enquiries concerning the authenticity of an issued document.

The method according to the invention is preferably employed in the case of documents in which the structural details are formed by optically prominent small particles of the substrate or by small extraneous inclusions in the substrate base material. Said particles may be e.g. photochromic fibers, fluorescent fibers, or fibers having some other specific optical properties, which fibers can be represented with high contrast against the optical background of the substrate base mass, and are preferably incorporated into the substrate mass. As already mentioned, document substrates with fluorescent fibers are known, for example from U.S. Pat. No. 6,054,021.

Quite generally, the method according to the invention should relate to those documents in which the optically prominent particles have specific optical properties, in particular a different coloration, wavelength-selective absorption, fluorescence, phosphorescence, photochromic properties, polarization-sensitive properties and/or viewing-angle-dependent properties, with respect to their substrate surroundings.

As already mentioned, many types of documents, for instance banknotes, are identified by individualizing document data provided on the document, e.g. by running serial numbers. When guaranteeing the authenticity of such documents, in particular, the method according to the present invention should be carried out in such a way that such specific document data are stored in combination with the substrate feature image data or, if appropriate, data derived therefrom. During image data recording, it is possible to carry out for this purpose a simultaneous optical acquisition of the document data provided on the relevant document specimen and of the structural detail image data, for example by means of joint scanning. The data record obtained should then contain an unambiguous spatial assignment of specific document data and specific substrate features.

The document data may e.g. be printed on the respective substrate by means of a fluorescent ink. Assuming that the substrate structural details to be acquired, for example statistically distributed structural fibers, also fluoresce, then it is possible to carry out the simultaneous imaginal acquisition of the specific substrate structural features and of the specific document data under fluorescence conditions.

Preferably, at least some of the relevant substrate features, in particular extraneous inclusions embedded in the substrate base mass, and/or possible markings, printed patterns or document data imprints on the substrate should contain photochromic material, preferably biological material, such as e.g. chemically or genetically modified bacteriorhodopsin or a plurality of bacteriorhodopsins which have different properties, e.g. different absorption maxima, different fluorescence properties, different light sensitivities or different kinetics for returning to the initial state. The specific optical properties of the photochromic material can be utilized in guaranteeing the authenticity and checking the authenticity of documents.

In the case of bacteriorhodopsin, it is possible e.g. to carry out a first image data acquisition with the document being illuminated with yellow light, and then to carry out a second image data acquisition with the document being illuminated with blue light. Subtracting the data of the first image data acquisition from the data of the second image data acquisition (or vice versa) yields image data highlighting e.g. those locations of the document which contain bacteriorhodopsin.

Even though a preferred embodiment of the method provides for guaranteeing the authenticity of such documents in which the optically prominent particles are incorporated into the substrate base mass, another application variant of the method according to the invention may provide for the need to guarantee documents in which a material with specific structural details that can be detected in a spatially resolved manner or optically is applied to the document substrate. This applied material may be e.g. a color, ink or a coating with prominent particles, e.g. mica laminae or the like. Printing such a color, ink or coating liquid onto a relevant document substrate then results in a random distribution of these particles on a defined area, said particles representing, in the sense of the present application, substrate features which are to be acquired in a spatially resolved manner according to the method of the present invention.

There are document types which do not require an identification that individualizes each individual document specimen in the sense of consecutive numbering, for example a set of entrance cards for an event which are not provided with serial numbers. With regard to guaranteeing the authenticity in the context of the method according to the invention, it may suffice for an image of the specific structural details from each document specimen to be stored with the note that the image data are assigned to a particular document type. Consequently, in such a case as well, the image data are stored in a database in a manner assigned to document data, the note of a relevant document type corresponding to such document data which, in this special case, are identical for all document specimens and need not necessarily be printed on the document.

For checking the authenticity of a document, the document is analyzed in a spatially resolved manner by means of a checking device in order to generate a data record with information about the arrangement and/or fashioning of individual substrate features of the document. The spatially resolved analysis is preferably effected optically by means of an imaging method, e.g. by scanning, the data obtained in this case containing image information about the region of the document under consideration. The image data determined at the document to be checked or, if appropriate, data derived therefrom are then compared with the data archived in the database. If it is ascertained in this case that a data record with corresponding authentication data exists for the document in the database, then an acknowledgement confirming the authenticity of the document can be output from the database to the checking entity. If there is no correspondence between the data to be compared with one another which is adequate in the context of a possible error tolerance, then this is an indication that the checked document is counterfeit.

The digital storage of the image data in the archiving database may be carried out in a conventional manner by means of an electronic data processing system which is programmed in accordance with the specific objective. The data obtained during the image recording should be subjected to data compression for reasons of economy in respect of storage space, the compressed data then being stored in a manner assigned to the document data, which, if appropriate, are likewise compressed. Suitable data compression programs are available and form part of the prior art, so that they need not be explained in any greater detail here.

In accordance with a procedure according to the invention, the database with the stored image data of the substrate features and the assigned document data is managed and kept secure only by one or by a small number of authentication entities authorized to do so.

The data exchange, that is to say the communication of the data from a relevant checking unit, set up for acquiring the image data from a document, to the data processing system controlling the archive database, may take place e.g. online by remote data transmission, in the same way as the acknowledgement from the data processing system that performs the data comparison. The remote data transmission may be effected by radio, for instance mobile radio, or in line-conducted fashion.

A situation in which a data exchange between a document checking entity and the authentication entity takes place by means of the transfer of data carriers, e.g. CD-ROMs or DVD-ROMs, is also conceivable. Taking account of the security measures that are offered, it is possible for the data exchange also to be handled via the Internet, for example.

In accordance with a further method variant according to the invention, an algorithm for calculating at least one check code value assigned to the document specimen is applied at least to a portion of the image data of a respective document or to data derived therefrom and the document specimen is then provided with a marking representing the check code value before the document is issued.

Preferably, only a portion of the recorded data record, e.g. a portion corresponding to a particular image area on the document, is used for calculating the check code value.

In the course of subsequently checking the authenticity of a document prepared with a check code value, said document is acquired imaginally by a checking unit in order to generate a corresponding data record, which is then processed using the special check code calculation algorithm. If the check code value that is determined in this case corresponds to the check code value found on the document, then this is to be assessed as a sign of the authenticity of the document. If the check code value determined in the course of checking the document does not correspond to the check code value found in the form of a marking on the document, then this is an indication that the checked document is counterfeit.

The check code value calculation algorithm, that is to say the encryption mechanism, must be safeguarded such that it is not accessible to unauthorized entities and thus cannot be verified by potential counterfeiters.

Checking devices or the image-acquiring components thereof may be integrated e.g. in automatic point-of-sale machines in order to check the authenticity of banknotes supplied to the automatic point-of-sale machine.

The invention also relates to a document with a marking which represents a check code which depends on specific substrate features or structural details of the document and has been determined by application of a check code value calculation algorithm to image data of relevant structural details. Instead of or in addition to such a marking, a corresponding check code may also, if appropriate, be stored in a memory chip, magnetic strip or the like.

The invention furthermore relates to a document in which signal-conducting, preferably light-guiding, fibers or the like are embedded in a quasi-random spatial arrangement in a substrate base mass, so that at least some fibers run from one area of the document to another area of the document and can take effect in signal-transmitting fashion.

The invention is explained in more detail below with reference to the figures.

FIG. 1 shows a fictitious document, e.g. a banknote, as an example of a specific specimen of a large number of documents whose authenticity can be ensured with a high degree of certainty by the method of the present invention.

FIG. 3a and FIG. 3b show the document from FIG. 1 in the state before and after an authenticity check.

The document 1 in accordance with FIG. 1 has a paper substrate, into which are incorporated in an arbitrary or random distribution, small fibers 2 that are optically prominent with respect to the substrate base mass. The case of the example involves fluorescent fibers whose fluorescence can be stimulated by irradiation with a UV stimulation light. The fibers 2 were added to the paper pulp, so that they were able to be distributed stochastically during the further processing of the paper pulp to form the sheetlike substrate. What is thus achieved is that each document specimen 1 produced in this way has a random and specific distribution of the optically prominent fibers 2 in the substrate. Preferably, the fibers are located in the document such that they can be made visible or are visible on both sides of the document.

The document in accordance with FIG. 1 has a value marking printed on at 3. 4 designates an indication of authenticatability, that is to say an indication that the document can be authenticated according to the present method, and a manufacturer identification marking on the substrate, which can be used to identify. the authorized manufacturer of the document or the entity authorized for authenticating the document.

At 5, FIG. 1 illustrates a specific serial number of the document, which is printed on the substrate 1.

At 6, FIG. 1 shows a printed image which is identical for all the specimens of the document type under consideration.

At 7, FIG. 1 illustrates an authentication change field, which will be discussed below.

Figure 2:
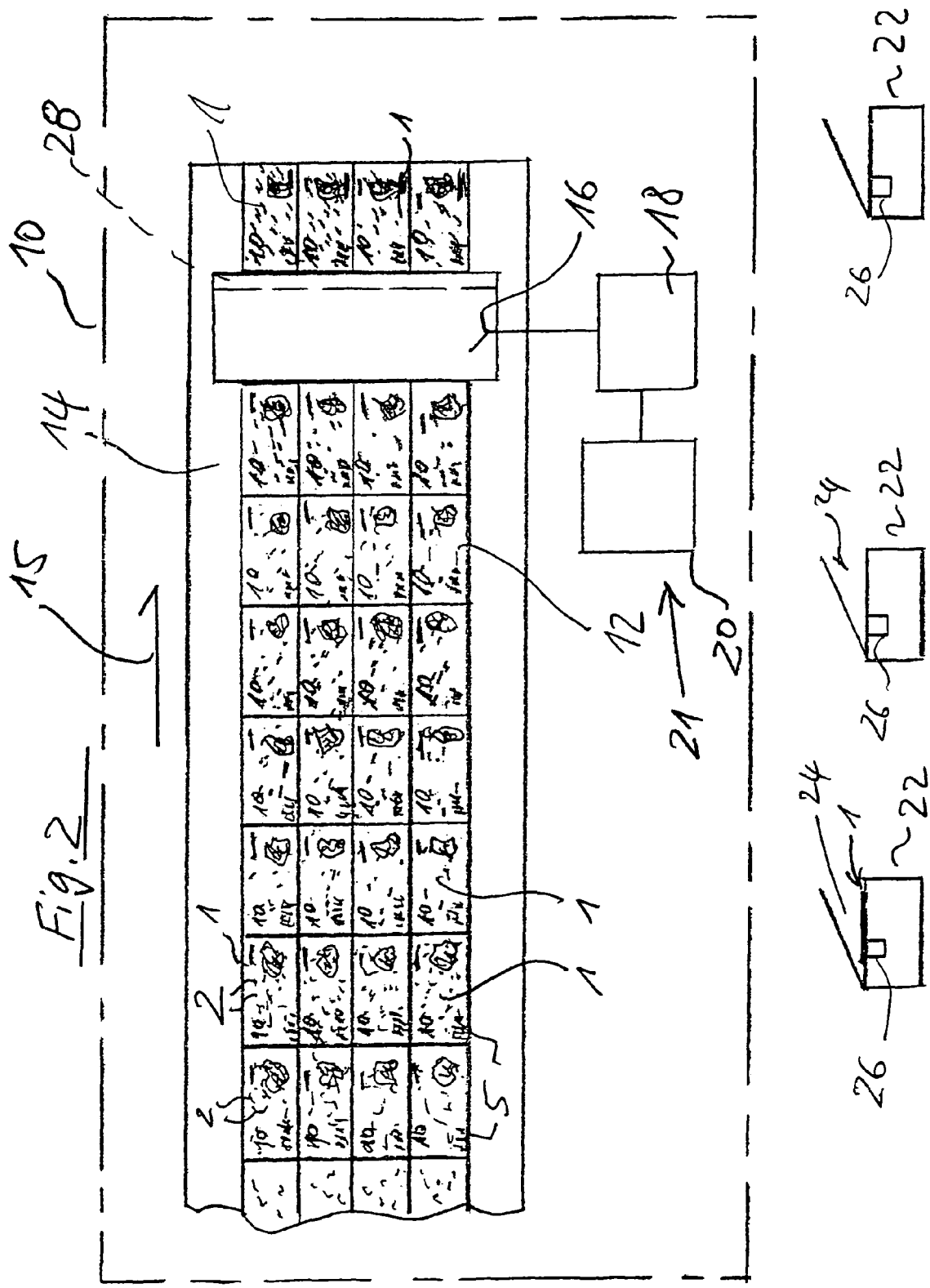
FIG. 2 shows a schematic illustration of a system comprising a central device for guaranteeing the authenticity of documents and decentralized checking devices for checking relevant documents.

In the schematic illustration in accordance with FIG. 2, the border 10 symbolizes a protected area in which banknotes 1 in accordance with FIG. 1. are manufactured by an authorized manufacturer. One of the last production stages in the manufacture of banknotes is sketched in the area 10, in which case paper sheets 12 comprising banknotes 1 that have already been printed but have not yet been separated by cutting are moved on a conveyor line 14 in the direction of a cutting machine (not shown). An automatic image recording device, preferably scanner device 16, is provided at the conveyor line 14, said device being set up for optically scanning the banknote paper sheets 12, which are moved intermittently on the conveyor line 14 in the direction of the arrow 15, on both sides in regions, in order to acquire an image of each banknote 1. The correct positioning of the banknotes 1 relative to the scanner 16 is effected automatically by means of the control of the drive means of the conveyor line 14, so that each banknote 1 which passes the scanner device 16 on the way along the conveyor line 14 is acquired optically. Since an image of the distribution of the fluorescent fibers 2 is also intended to be recorded during the optical acquisition, the respective scanning operation is effected under the conditions of fluorescence of said fibers 2, the fluorescence stimulation being effected by irradiation by means of a UV light source (not shown). The serial number 5 is also acquired during the image recording of each banknote, which serial number can preferably be made visible as a fluorescent marking. The image data recorded by the scanner device 16 are accepted by a data processing system 18, which compresses the image data according to a data compression program and stores them in the compressed form in an archive database 21 of the archive memory 20. In this case, the image data assigned to the individual banknotes 1 are stored in the archive database 21 in a manner assigned to the respective serial numbers 5. After being completed, the banknotes 1 are put into circulation by an entity authorized to do so.

The archive database 21 is kept secure by an authorized entity, e.g. by the manufacturer of the banknotes 1. However, it is available for comparison enquiries concerning the authenticity of banknotes in circulation.

The checking of the authenticity of a banknote 1 using the archive database may take place in the following manner. The banknote 1 to be checked is fed to a checking unit 22, which has an image recording device 24 for recording image data of the banknote which is respectively to be checked. The image recording device 24 may contain e.g. an optical scanner or a digital camera. In the case of the example, the image recording is effected in conjunction with UV exposure in order to create fluorescence conditions for the banknote to be checked.

The image data obtained during the image recording of a banknote to be checked can then be transmitted to the data processing device 18 in the protected area 10 via a remote data transmission connection, for the purpose of a comparison enquiry. According to the serial number 5 of the banknote to be checked, the data processing device 18 then accesses the archive database 21 in order to compare the image data stored for the serial number in the archive database 21 with the received image data. If this comparison reveals correspondence in the context of a particular error tolerance, then the data processing device 18 sends an acknowledgement to the relevant checking unit 22 in order to confirm the authenticity of the checked banknote 1. Otherwise, an acknowledgement is effected from the data processing device 18 to the checking unit 22 with the information that the authenticity of the checked banknote is not confirmed.

The decentralized checking units 22 may be integrated for example in automatic point-of-sale machines/automatic cash machines or the like.

It has been assumed hitherto with reference to FIG. 2 that the archive database 21 is kept secure by an authorized entity in the protected area and that only results of comparison enquiries are communicated from the data processing device 18 to the respective enquiry device 22.

In accordance with one variant of the method for guaranteeing authenticity according to the invention, it may be provided that copies of the archive database 21 are created and communicated to decentralized authentication entities. These decentralized authentication entities can then likewise process comparison enquiries.

In accordance with a further variant of the authenticity guaranteeing system according to the invention, the data processing device 18 determines a check code value for each individual banknote 1 on the basis of the image data originally acquired by means of the image recording device. The check code value is calculated according to a protected algorithm which is applied to the respective image data of the banknotes 1. Since the banknotes differ on account of the random distribution of the fluorescent security fibers 2 in the substrate and these differences are manifested in the image data, the check code calculation algorithm leads to different check code values for the individual banknotes 1.

FIG. 2 indicates by dashed lines a printing mechanism 28 assigned to the variant of the authenticity guaranteeing system being discussed in the present case, which printing mechanism is connected downstream of the image recording device 16 and is set up for printing onto the banknotes 1 the check code values respectively determined by means of the data processing device 18, to be precise preferably by means of a fluorescent or photochromic printing ink. The banknotes 1 prepared in this way can then be put into circulation after being completed.

In a departure from the situation described above with reference to FIG. 2, a check of such a banknote which is based only on the check code value does not require a data exchange between checking unit 22 and the archive database management 18. The checking units 22 contain a computer or communicate with a computer which calculates a check code value from the image data acquired by means of the image recording device 24 during the checking of a banknote 1. The check code value of the banknote 1 calculated during the check is then compared with the check code value printed on the banknote 1 by the checking unit 22. In the case where the printed-on check code value 7 corresponds to the check code value calculated in a decentralized manner during the check, the checking unit 22 confirms the authenticity of the banknote 1. If correspondence of the check code value 7 is not ascertained, then this is assessed as an indication that the checked banknote 1 is counterfeit.

The image data acquisition and/or image data evaluation for the original archiving and/or during the later checking of documents may be with reference to one or, if appropriate, a plurality of partial areas of the document. The position of such a partial area on the documents may be subject to secrecy, so that only authorized entities and in particular the authentication entity know it. In particular, it may be provided that the partial area which is to be taken into consideration for a check of a document is determined at the current time for a respective checking operation by the authentication entity and is communicated to the checking entity or the checking unit by data transmission only when the checking operation is initiated. If authentication is not possible owing e.g. to severe contamination of the partial area, a data record concerning another partial area can be requested by remote data transmission from the authentication entity before the document is rejected as not authenticatable, withdrawn or destroyed by the checking unit. Restricting the check to partial areas limits the volume of data to be acquired, to be transmitted and to be checked to a comparatively small value.

The image data acquisition and/or image data evaluation may furthermore be effected spectrally selectively. For this purpose it may be provided that varicoloured fluorescent particles or fibres are distributed in the substrate. The spectral ranges taken into account in the evaluation could likewise be kept secret and, if appropriate, be changed from checking operation to checking operation.

A further embodiment variant of interest of the method according to the invention is quite generally characterized by the fact that a specific change in the document initiated and documented by the authentication entity is performed during a respective checking operation. During the next checking operation the authentication entity expects the presence of the changed feature in order to qualify the document as genuine. The change in the document corresponds to the addition or variation of a feature which documents the authentication operation. The possibilities for a specific change in a document in the sense explained above are manifold. Thus, by way of example, individual substrate features may be changed irreversibly by means of a laser. In the simplest case, it is possible to produce a small burn on the document or a small hole in the document by means of laser radiation. Moreover, it is possible for a small location on the document to be printed with ink or metal vapor, e.g. by means of a printer, for instance a thermosublimation printer. If the document is printed with fluorescent dyes, then the latter can be irreversibly bleached with intensive laser light in order to bring about the targeted change.

If documents are provided with memory chips or, if appropriate, magnetic strips, etc., such a specific change may also consist in storing a check code in the memory chip or magnetic strip, the presence of which check code is among the preconditions for authentication during a next check of the document.

In the context of the present application, independent importance is also accorded to the aspect of the specific change in the document performed each time a document is checked, and the checking for the presence of the changed feature during a next checking operation of the document.

This aspect of the invention yields a very high degree of protection against forgery. Even if counterfeiters succeed in producing exact copies of an issued document, at most one specimen of these copies can deceive the authenticity checking operation since, after all, the first specimen checked, after the check, has the changed or added feature and, upon a next enquiry, the authentication entity expects the said changed feature at the relevant document in order to confirm authenticity.

FIGS. 3a and 3b illustrate a document of the type shown in FIG. 1 before (FIG. 3a) and after (FIG. 3b) a checking operation with a specific change in the document. The document 1 has an authentication change field in the form of a pixel matrix 8. In the event of a check of the document 1 in FIG. 3a by means of a checking unit 22 in accordance with FIG. 2, the pixels P1 and P2 have been changed, so that the document 1 has thus obtained a new identity having the features of FIG. 3b. The pixel change has been brought about by irreversibly changing a dye applied on the field 8 at the relevant locations P1 and P2 by means of laser radiation of a laser 26 integrated in the relevant checking unit 22, for example by bleaching a fluorescent dye. The information regarding the concrete locations of the authentication change field 8 at which pixel changes are intended to be brought about has been communicated to the checking unit 22 or the controller of the laser 26 integrated therein in the course of the relevant checking operation by means of bidirectional data transmission between checking unit 22 and authentication entity 10. The change in the document 1 is noted in the archiving database 21 of the authentication entity 10 in order to be able to take it into account as an authenticity criterion in the case of a subsequent check of the same document 1.

Figure 4:
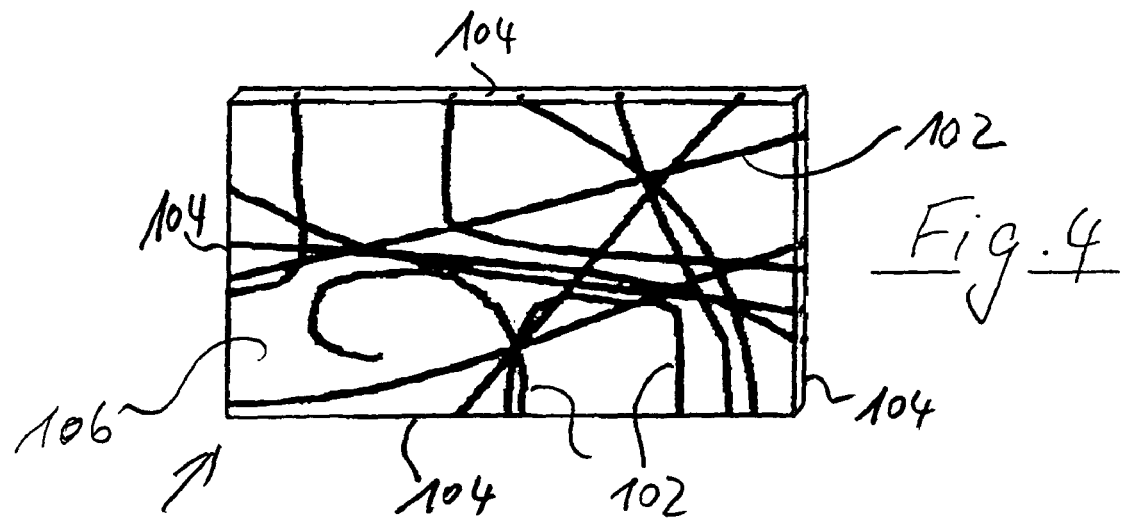
FIG. 4 and FIG. 5 show a substrate material with embedded light-guiding fibers in order to elucidate a further aspect of the invention.
Figure 5:
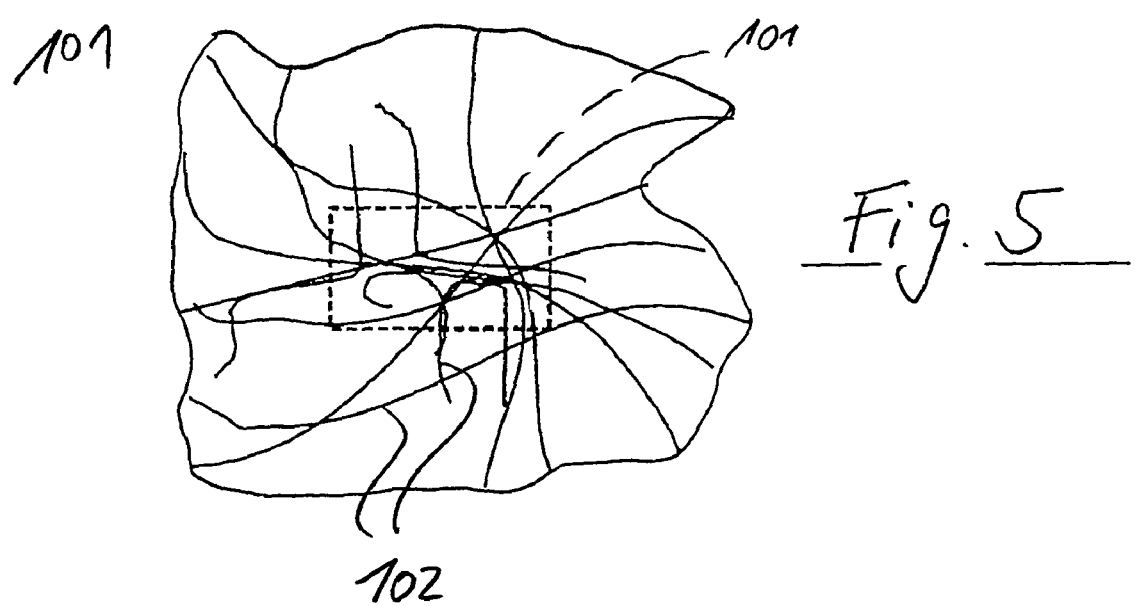

A further aspect of the invention is explained below with reference to FIGS. 4 and 5. FIG. 4 shows a document substrate 101 cut to size in the form of a card, for instance a credit card or the like. The card 101 comprises a plastic as substrate base material and light-guiding fibers 102 which permeate the substrate base material or are embedded therein. The distribution and the positioning of the light-guiding fibers 102 in the substrate 101 are arbitrary and have arisen on account of a stochastic or quasi-stochastic process during the production of the substrate. In the case of the example, the light-guiding fibers were added to the still liquid plastic of the substrate base mass in a disordered manner prior to curing and the plastic with embedded light-guiding fibers was shaped into larger plates. FIG. 5 illustrates a region from such a plate, depicted in cutaway fashion, after the curing of the plastic. The card 101 illustrated in FIG. 4 was cut out of this plate. The card contour is illustrated by dashed lines in FIG. 5.

On account of the quasi-stochastic positioning of the fibers 102 within the substrate 101, the distribution of the fiber ends at the individual card sides is also random. It will equally be random what fiber reaches from one narrow side 104 to one of the other narrow sides 104 of the card 101 in order to be able to transport light radiated in at one narrow side toward the other narrow side. Consequently, when guaranteeing the authenticity in the context of the invention, the light pattern arising at one or at a plurality of narrow sides 104 of the card depending on the illumination of one or a plurality of the other narrow sides 104 can be optically acquired in a spatially resolved manner in order to generate a data record whose data or, if appropriate, data derived therefrom are stored in an archived database in order to keep them ready for later authentication enquiries. In the event of a later authenticity check of a credit card, smart card or the like which is produced on the basis of the substrate 101, the light pattern is then correspondingly acquired in a spatially resolved manner at one or, if appropriate, a plurality of narrow sides 104 in a manner dependent on the light radiated into one or a plurality of the other narrow sides 104 of the card 101, in order to obtain data which are then to be compared with the data stored in the archive database and consequently permit an authenticity check.

In the example shown, it has been assumed that the light-guiding fibers 102 extend essentially in the plane of the card 101 and that the spatially resolved analysis is restricted to the narrow sides 104. In alternative embodiments, it may be provided that the surface sides 106 are additionally or exclusively acquired during the spatially resolved analysis of the substrate 101. In this case, it may be provided that light-guiding fibers 102 also run distinctly transversely with respect to the card plane.

The aspect of embedding signal-transmitting fibers with quasi-random positioning within a substrate base material for the purpose of guaranteeing authenticity, which aspect was discussed above with reference to FIGS. 4 and 5, is, in the context of the invention, not just restricted to card formats, but can also be applied to other two- or three-dimensional formats of documents or articles of value, etc. The substrate base material, preferably plastic, may be transparent or nontransparent.

Instead of light-guiding fibers, electrically conductive wires could be embedded, in which case, during the evaluation, it is then necessary to employ an electrical or electronic method for determining the position of the wire ends. In the context of the invention, the same principle may generally be applied to articles or housings of articles, for example of electronic chips or the like, or it can be applied to packaging materials.

The invention claimed is:

1. A method for guaranteeing the authenticity of documents the method comprising:
   providing a plurality of documents, before being issued, each of which has a substrate with substrate features specific to each individual document and is provided with document data;
   analyzing with a scanning device a respective document of said plurality of documents, before being issued, in a spatially resolved manner altogether or partly to generate a data record with information about at least one of the arrangement of and fashioning of specific substrate features of the document; and
   storing the data of said data record or data derived therefrom in a remote database together with or in a manner assigned to document data of the relevant document, in order to keep them ready for later authentication enquiries;
   wherein each authenticity check of an issued document involves performing with a checking device, a specific change in a feature of the document, and the presence of the changed feature is a prerequisite for authentication of the document in the event of a next authenticity check.

2. The method for guaranteeing authenticity as claimed in claim 1, wherein said scanning device includes an optical scanner and the spatially resolved analysis being carried out optically using a method that generates image data, by single-sided or two-sided scanning of the document.

3. The method for guaranteeing authenticity as claimed in claim 1, the specific substrate features being formed by stochastically or quasi-stochastically distributed, optically prominent particles (2), in particular fibers.

4. The method for guaranteeing authenticity as claimed in claim 3, the optically prominent particles (2) being incorporated into the substrate mass.

5. The method for guaranteeing authenticity as claimed in claim 3, the optically prominent particles (2) adhering to the substrate surface.

6. The method as claimed in claim 5, the optically prominent particles having been applied to the substrate surface as admixtures to a printing ink or ink.

7. The method for guaranteeing the authenticity of documents as claimed in claim 1, the optically prominent particles (2) having specific optical properties, including fluorescent, phosphorescent, photochromic, polarization-sensitive or viewing-angle-dependent optical properties, and the spatially resolved optical analysis of the relevant document being carried out utilizing the specific optical properties of the particles (2).

8. The method for guaranteeing the authenticity of documents as claimed in claim 1, at least one of substrate features and document data features containing a photochromic material, including a bacteriorhodopsin or a plurality of bacteriorhodopsins which have different optical properties.

9. The method for guaranteeing authenticity as claimed in claim 1, the document data comprising data that individualize the relevant document, in particular serial number data.

10. The method for guaranteeing authenticity as claimed in claim 1, the document data comprising information about at least one of the document manufacturer, about an entity authorized for authentication, about the authentication possibility, for identification of the document owner, and about at least one of the intended use of the document and the value of the document.

11. The method for guaranteeing authenticity as claimed in claim 1, document data being provided on the substrate in the form of graphical representations, letters, numbers or the like.

12. The method for guaranteeing authenticity as claimed in claim 1, document data being stored in a memory chip and/or on a magnetic strip of the document.

13. The method for guaranteeing authenticity as claimed in claim 1, further comprising calculating at least one check code value assigned to the respective document specimen from at least to a portion of the image data of a respective document or to data derived therefrom and the document specimen being provided with a marking that represents the check code value.

14. The method as recited in claim 1, wherein said plurality of documents are documents of value.

15. The method as recited in claim 1, wherein said plurality of documents are banknotes.

* * * * *